United States Patent
Chen et al.

(10) Patent No.: US 11,126,229 B2
(45) Date of Patent: Sep. 21, 2021

(54) DISPLAY PANEL

(71) Applicant: AU Optronics Corporation, Hsin-Chu (TW)

(72) Inventors: Ya-Ting Chen, Hsin-Chu (TW); Sheng-Wen Cheng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 32 days.

(21) Appl. No.: 16/702,655

(22) Filed: Dec. 4, 2019

(65) Prior Publication Data
US 2020/0272209 A1 Aug. 27, 2020

(30) Foreign Application Priority Data
Feb. 27, 2019 (TW) .................................. 108106878

(51) Int. Cl.
*G06F 1/16* (2006.01)
*G02F 1/1362* (2006.01)

(52) U.S. Cl.
CPC ...... *G06F 1/1698* (2013.01); *G02F 1/136286* (2013.01)

(58) Field of Classification Search
CPC ................. G06F 1/1698; G06F 1/1637; G02F 1/136286; G02F 1/1313; G02F 1/1333; G02F 1/133; H04B 5/00; H01Q 1/22
See application file for complete search history.

(56) References Cited

U.S. PATENT DOCUMENTS

| | | | |
|---|---|---|---|
| 9,680,200 B2 | 6/2017 | Li et al. | |
| 9,870,493 B2 | 1/2018 | Yashiro et al. | |
| 10,890,997 B2 * | 1/2021 | Kim | H01L 27/323 |
| 2009/0167699 A1 | 7/2009 | Rosenblatt et al. | |
| 2017/0177120 A1 | 6/2017 | Kyutoku et al. | |
| 2018/0120623 A1 * | 5/2018 | Shiina | G02F 1/1368 |
| 2018/0287243 A1 | 10/2018 | Ko et al. | |
| 2019/0220123 A1 * | 7/2019 | Kanaya | G06F 3/0443 |

FOREIGN PATENT DOCUMENTS

| | | |
|---|---|---|
| CN | 102347527 A | 2/2012 |
| CN | 204790936 U | 11/2015 |
| CN | 207009557 U | 2/2018 |
| TW | M473562 U | 3/2014 |
| TW | 201621583 A | 6/2016 |

* cited by examiner

*Primary Examiner* — Rockshana D Chowdhury
(74) *Attorney, Agent, or Firm* — McClure, Qualey & Rodack, LLP

(57) ABSTRACT

A display panel has a display area, a first wiring area, and a second wiring area, in which the display area is adjacent to the first and second wiring areas. The display panel includes a plurality of pixels, a first loop pattern, and a second loop pattern. The pixels are arranged within the display area. The first loop pattern is arranged within the display area and is located above the pixels. The first loop pattern includes a first wiring. The second loop pattern is arranged within the first wiring area and is located outside the second wiring area. The second loop pattern is electrically connected to the first loop pattern and includes a second wiring, in which the wiring width of the first wiring is smaller than the wiring width of the second wiring.

9 Claims, 8 Drawing Sheets

DISPLAY PANEL

This application claims priority to Taiwan Application Serial Number 108106878, Feb. 27, 2019, which is herein incorporated by reference in its entirety.

BACKGROUND

Technical Field

The present disclosure relates to a display panel.

Description of Related Art

With the development of technology, various portable electronic devices have gradually become mainstream products in the consumer market, such as smart phones, smart watches, tablets or notebooks. The functions of these portable electronic devices are also becoming more and more abundant with market trends. For example, the function of near-field wireless communication may be added to the smart phone, such that the smart phone is able to perform the payment function via the near-field wireless communication function. In this regard, since the addition of the near-field wireless communication function to the portable electronic device increases the complexity of the structure, the original function of the electronic device is affected. Therefore, how to add the near-field wireless communication function to the portable electronic device has become one of the development topics in the related field.

SUMMARY

An aspect of the present disclosure is to provide a display panel, which has a display area, a first wiring area, and a second wiring area, and the display area is adjacent to the first and second wiring areas. The display panel includes a plurality of pixels, a first loop pattern, and a second loop pattern. The pixels are arranged within the display area. The first loop pattern is arranged within the display area and is located above the pixels. The first loop pattern includes a first wiring. The second loop pattern is arranged within the first wiring area and is located outside the second wiring area. The second loop pattern is electrically connected to the first loop pattern and includes a second wiring, in which the wiring width of the first wiring is smaller than the wiring width of the second wiring.

In some embodiments, the display panel further includes a bridging pattern. The bridging pattern is arranged within the second wiring area and electrically connected to the first loop pattern. The bridging pattern includes a third wiring, and the wiring width of the first wiring is smaller than the wiring width of the third wiring.

In some embodiments, a loop extension length of the first loop pattern has a first length L1, a loop extension length of the second loop pattern has a second length L2, and a bridging extension length of the bridging pattern has a third length L3, in which (L1) >(L2+L3), and 0.05*(L1+L2+L3) ≤(L2+L3) ≤0.4*(L1+L2+L3).

In some embodiments, the display area has a first area and a second area which are not overlapped with each other. The first area surrounds the second area, and the first loop pattern is completely located within the first area, in which the second area is located between the first wiring area and the second wiring area.

In some embodiments, the display area has a first area and a second area which are not overlapped with each other. The first area surrounds the second area, and the first loop pattern is completely located within the first area. The display panel has a third wiring area, and the second area is located between the first wiring area and the third wiring area. The display panel further includes a third loop pattern that is arranged within the third wiring area and electrically connected to the first loop pattern. The third loop pattern includes at least one fourth wiring, and the wiring width of the first wiring is smaller than the wiring width of the fourth wiring.

In some embodiments, the first loop pattern, the second loop pattern and the bridging pattern form a plurality of loop antennas collectively, and the plurality of loop antennas are separated from each other.

In some embodiments, the display panel further includes a driving component that is electrically connected to two terminals of the bridging pattern and configured to provide an alternating current signal.

In some embodiments, the first loop pattern and the second loop pattern collectively form a multi-turn loop, and the loop extends along a plurality of straight paths or a plurality of circular arc paths.

In some embodiments, the first wiring has a wiring width of between 4 microns and 6 microns.

In some embodiments, the second wiring has a wiring width of between 0.5 millimeters and 10 millimeters.

With the aforementioned configuration, the first loop pattern, the second loop pattern, and the bridging pattern may collectively form the loop antenna. Since the mesh structure of the first loop pattern can have high light transmittance, the loop antenna also has high light transmittance in the portion corresponding to the display area. Therefore, the effect of the loop antenna on the display function of the display panel can be reduced. By the difference in size of the wirings, the second loop pattern and the bridging pattern can reduce the impedance of the loop antenna, thereby increasing the strength of the magnetic field and enhancing the transmission energy of the wireless communication. In addition, since the number of the lower impedance area of the loop antenna is more than one, it can help balance the magnetic field distribution generated by the loop antenna by coupling.

BRIEF DESCRIPTION OF THE DRAWINGS

FIG. 1B is an enlarged view of the region 10 of FIG. 1B.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other words, in some embodiments of the present invention, these practical details are not necessary. Moreover, some well-known structures and devices are schematically depicted in order to simplify the drawings.

In the present invention, it is comprehensible that terms such as first, second, and third are used to describe various elements, components, areas, layers and/or blocks. The terms are used for identifying single element, component, area, layer and/or block. Therefore, the following first element, component, area, layer and/or block may also be called as the second element, component, area, layer and/or block without departing from the intention of the present invention. "Approximately" or "substantially" used herein includes an average value within an acceptable deviation range and the described value. For example, "approximately" or "substantially" may represent being within one or more standard deviations of the described value, or within ±30%, ±20%, ±10%, or ±5%.

The display panel of the present disclosure is able to integrate the display function and the wireless communication function, in which the display function can be implemented by a pixel structure and the wireless communication function can be implemented by a loop antenna.

Figure 1A:
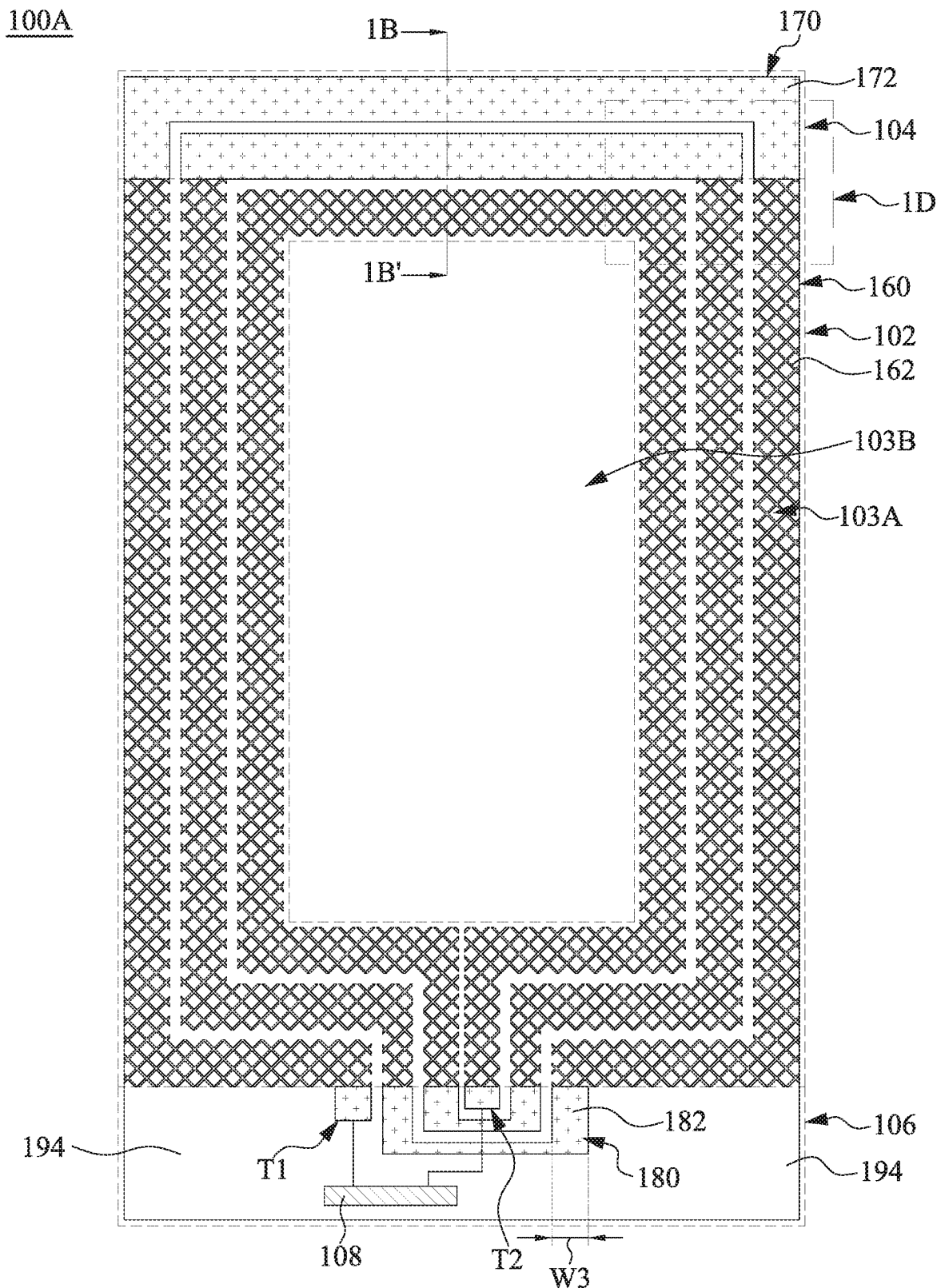
FIG. 1A illustrates a top view of a display panel according to a first embodiment of the present disclosure.
Figure 1B:
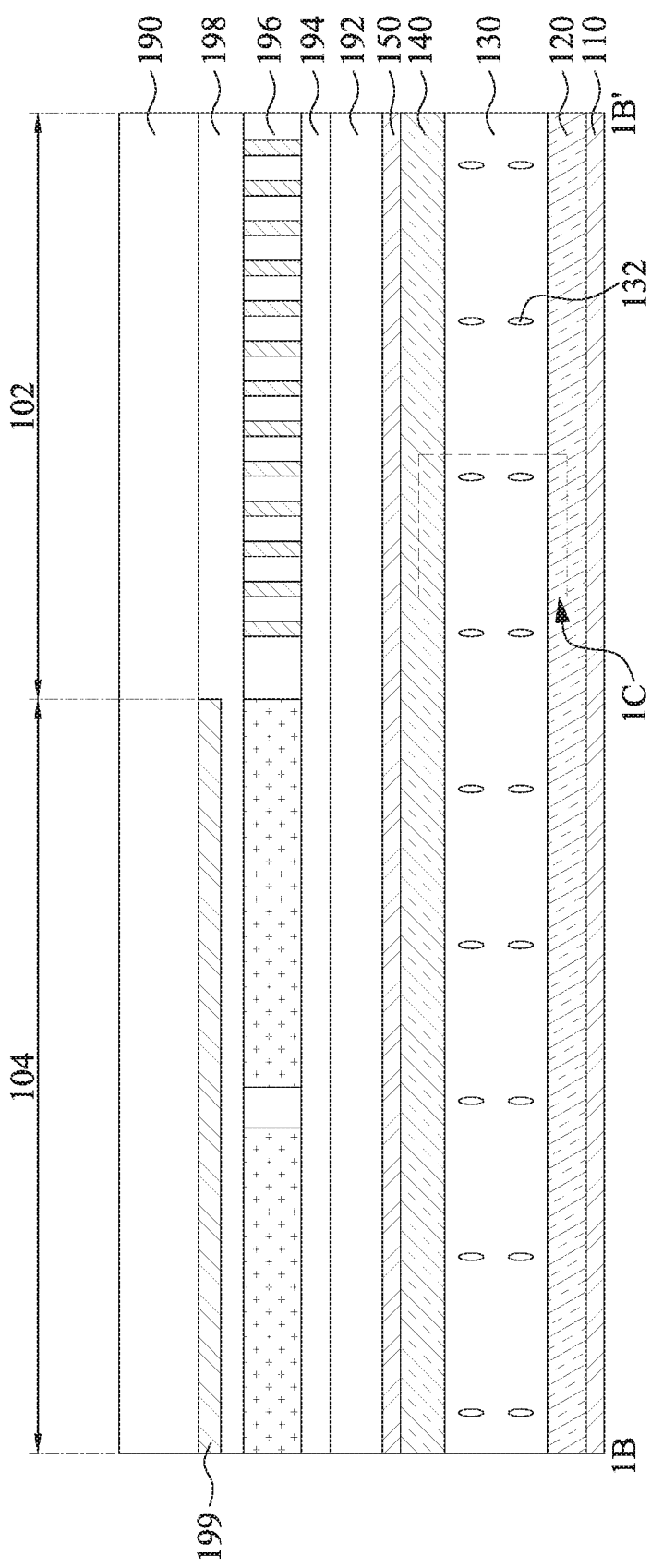
FIG. 1B illustrates a sectional view along the line segment 1B-1B' of FIG. 1A.

Reference is made to FIG. 1A and FIG. 1B. FIG. 1A illustrates a top view of a display panel 100A according to a first embodiment of the present disclosure, and FIG. 1B illustrates a sectional view along the line segment 1B-1B' of FIG. 1A.

The display panel 100A has a display area 102, a first wiring area 104, and a second wiring area 106, in which the display area 102 is adjacent to the first wiring area 104 and the second wiring area 106, and the first wiring area 104 and the second wiring area 106 are not overlapped with each other. Here, "the first wiring area 104 and the second wiring area 106 are not overlapped with each other" means that the respective boundaries of the first wiring area 104 and the second wiring area 106 are separated from or aligned with each other in the upper viewing angle (e.g., the viewing angle of FIG. 1A). For example, in the present embodiment, the first wiring area 104 and the second wiring area 106 are separated by the display area 102, so that the respective boundaries of the first wiring area 104 and the second wiring area 106 are separated from each other. In addition, the display area 102 may be used to display the image provided from the display panel 100A, and the wiring areas 104, 106 may be used to place the routing and may be shielded by the light shielding layer, the ink or the frame after the display panel 100A is assembled.

Figure 1C:
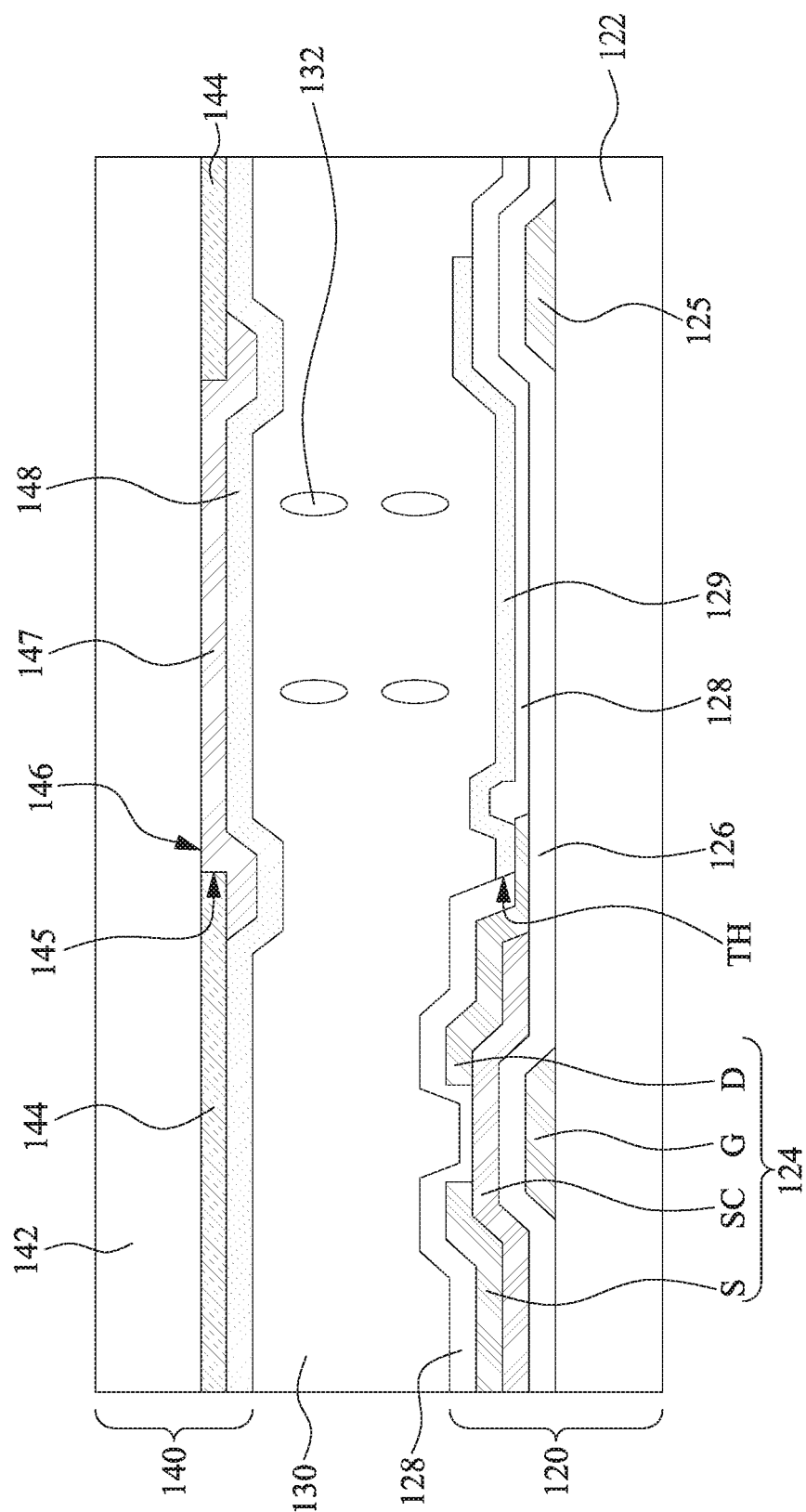
FIG. 1D illustrates an enlarged view of the region 1D of FIG. 1A.

The display panel 100A includes a lower polarizer 110, an array substrate 120, a display medium layer 130, a color filter layer substrate 140, an upper polarizer 150, a first loop pattern 160, a second loop pattern 170, a bridging pattern 180, and a cover plate 190. In order to simplify FIG. 1B, the components in the array substrate 120 and the color filter layer substrate 140 of FIG. 1B are illustrates in FIG. 1C. The array substrate 120, the display medium layer 130, the color filter layer substrate 140, and the upper polarizer 150 are sequentially stacked on the lower polarizer 110, and the first loop pattern 160 and the second loop pattern 170 are disposed between the color filter layer substrate 140 and the cover plate 190.

The lower polarizer 110 may be attached to the lower surface of the array substrate 120. In addition, in some embodiments, the display panel 100A may further include a backlight module (not shown). The backlight module may be connected to the lower polarizer 110 and includes a light source and a light guide plate to provide the light source of the display panel 100A.

Reference is made to FIG. 1B and FIG. 10. FIG. 10 is an enlarged view of the region 10 of FIG. 1B. The array substrate 120 includes a first substrate 122, a plurality of thin film transistors 124 (only one is illustrated in FIG. 10 as an example), a gate insulating layer 126, a dielectric layer 128, and a pixel electrode 129. The first substrate 122 may be used as a support substrate for the array substrate 120 in the process, which may be, for example, a glass substrate, so that other components or layers of the array substrate 120 may be formed on the first substrate 122.

The thin film transistors 124 and the gate insulating layer 126 are disposed on the first substrate 122. Each of the thin film transistors 124 includes a source electrode S, a drain electrode D, a semiconductor layer SC, and a gate electrode G. The gate electrode G of the thin film transistor 124 may be disposed on the first substrate 122, and the gate insulating layer 126 covers the gate electrode G. The semiconductor layer SC is disposed on the gate insulating layer 126. The semiconductor layer SC may be used as a channel region of the thin film transistor 124, and the material thereof may include silicon, such as a monocrystalline silicon, a polycrystalline silicon, or other suitable material.

The source electrode S and the drain electrode D are disposed on the semiconductor layer SC, and the source electrode S and the drain electrode D which are located on the semiconductor layer SC are spaced apart from each other. The drain electrode D may extend from the semiconductor layer SC to the gate insulating layer 126. The material of the source electrode S and the drain electrode D may be a metal. For example, the source electrode S and the drain electrode D may be formed in conjunction with a data line (not shown) of the display panel 100A by patterning the same metal layer, and the source electrode S is electrically connected to the data line. Furthermore, the storage capacitor 125 may be formed on the first substrate 122 and covered by the gate insulating layer 126. The gate electrode G and the storage capacitor 125 may be formed by patterning the same metal layer.

The dielectric layer 128 is disposed on the thin film transistor 124 and the gate insulating layer 126 and covers the source electrode S, the drain electrode D, and the semiconductor layer SC of the thin film transistor 124. The dielectric layer 128 has a contact hole TH, and the contact hole TH is located above the drain electrode D. In some embodiments, after the dielectric layer 128 is formed, a portion of the dielectric layer 128 is removed via an etching process to expose the drain electrode D. In some embodiments, the material of the dielectric layer 128 may be an organic material or an inorganic material such as epoxy resin, silicon oxide (SiOx), silicon nitride (SiNx), a compound composed of silicon oxide and silicon nitride, or other suitable dielectric material. The dielectric layer 128 may be used as a planar layer or a passivation layer. The pixel electrode 129 is disposed on the dielectric layer 128 and is in contact with the drain electrode D through the contact hole TH of the dielectric layer 128 to electrically connect the thin film transistor 124. In some embodiments, the material of the pixel electrode 129 includes a transparent conductive material such as indium tin oxide, indium zinc oxide, zinc oxide, carbon nanotubes, indium gallium zinc oxide or other suitable materials.

The display medium layer 130 is disposed on the array substrate 120 and is located between the array substrate 120 and the color filter layer substrate 140. The display medium layer 130 may include display medium 132. For example, the display medium layer 130 may be a liquid crystal layer and have liquid crystal molecules.

The color filter layer substrate 140 includes a second substrate 142, a light shielding layer 144, a color filter layer 146, and a common electrode 148. The second substrate 142 may be used as a support substrate for the color filter layer substrate 140 in the process, which may be, for example, a glass substrate, so that other components or layers of the color filter layer substrate 140 may be formed on the second substrate 142.

The light shielding layer 144 and the color filter layer 146 are disposed on the second substrate 142 and are located between the display medium layer 130 and the second substrate 142. The light shielding layer 144 may be formed in the pattern of a black matrix and has a plurality of openings 145. In some embodiments, the light-shielding material is used to form the layer firstly, and then the patterning process is performed on this light-shielding material to form the light-shielding layer 144 with the openings 145. The color filter layer 146 may be disposed in the opening 145 of the light shielding layer 144 and partially cover the light shielding layer 144. In some embodiments, the color filter layer 146 may include a color resist layer 147, such as a red color resist layer, a green color resist layer, or a blue color resist layer, and the color resist layers of different colors may be arranged periodically. The common electrode 148 may be disposed on the light shielding layer 144 and the color filter layer 146, and located between the display medium layer 130 and the color filter layer 146. The material of the common electrode 148 includes a transparent conductive material, such as indium tin oxide, indium zinc oxide, zinc oxide, carbon nanotubes, indium gallium zinc oxide or other suitable materials.

By using the aforementioned arrangements, the array substrate 120 may form a plurality of pixels in the display area 102 in conjunction with the color filter layer substrate 140, and these pixels are at least arranged in the display area 102. The display panel 100A may display the color image through the pixels. Specifically, the potential of the pixel electrode 129 can be controlled by driving the thin film transistor 124 so that the pixel electrode 129 and the common electrode 148 can form the electric field by coupling, thereby controlling the optical rotation of the display medium layer 130 to control the polarization of the light traveling from the array substrate 120 to the color filter layer substrate 140. The light traveling from the display medium layer 130 to the color filter layer substrate 140 may have the corresponding color after passing through the color filter layer 146, and thus displaying the color image.

Reference is made back to FIG. 1A and FIG. 1B. The upper polarizer 150 may be attached to the upper surface of the color filter layer substrate 140. The display panel 100A may further include a first adhesive layer 192 and a third substrate 194, in which the first adhesive layer 192 may be an optically clear adhesive (OCA) and the third substrate 194 may be a light transmissive substrate such as the glass substrate. The first loop pattern 160 (in order to make the drawing easy to understand, the first loop pattern 160 of FIG. 1B is shown with a screentone), the second loop pattern 170, and the bridging pattern 180 may be disposed on the third substrate 194. In some embodiments, the first loop pattern 160, the second loop pattern 170, and the bridging pattern 180 may be formed on the third substrate 194 firstly, and then the third substrate 194 is attached to the color filter layer substrate 140 via the first adhesive layer 192 (e.g., attached to the second substrate 142 of FIG. 10).

Figure 1D:
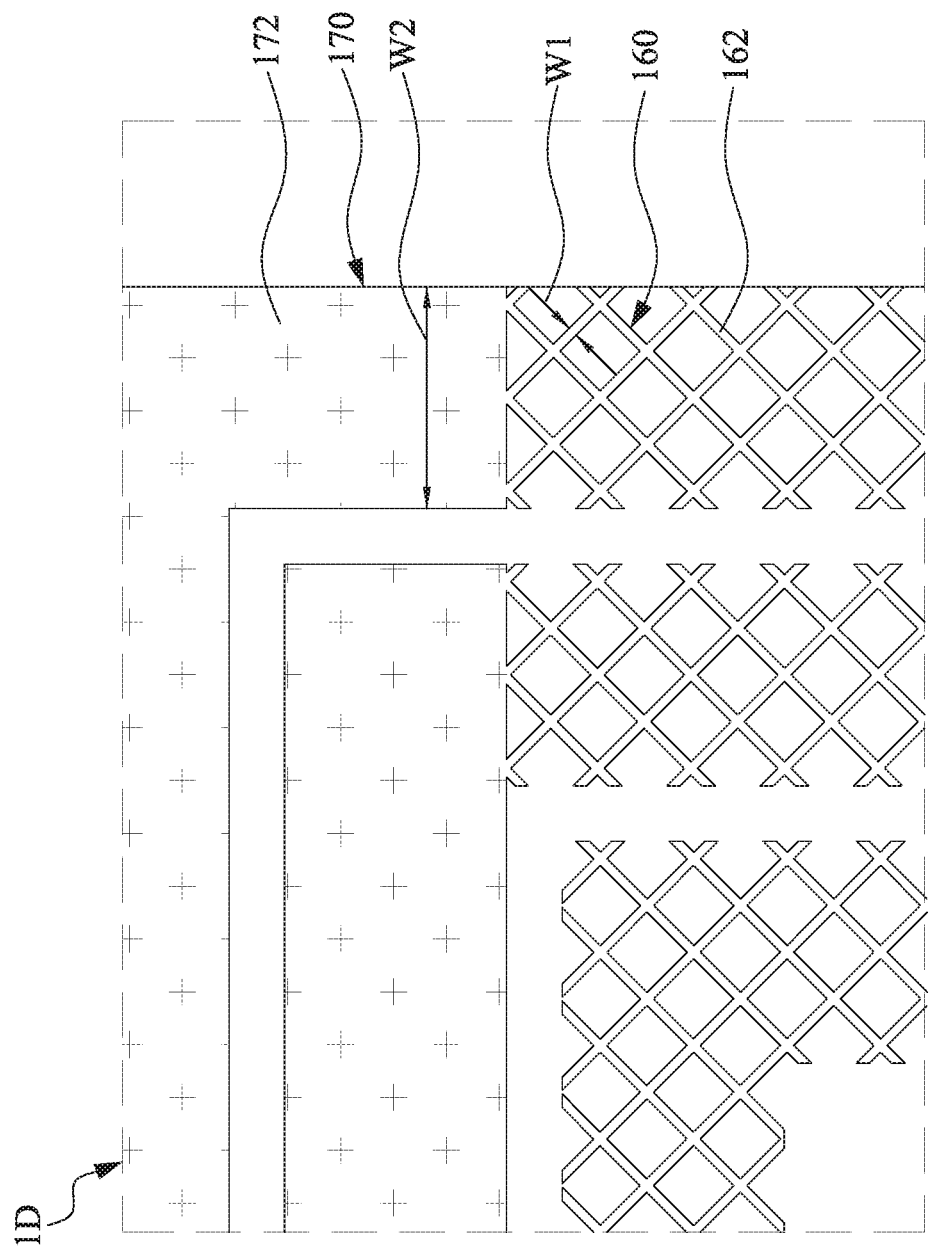

Reference is made to FIG. 1A, FIG. 1B, and FIG. 1D, in which FIG. 1D illustrates an enlarged view of the region 1D of FIG. 1A. The first loop pattern 160 is arranged within the display area 102 and is located above the pixels formed by the array substrate 120 in conjunction with the color filter layer substrate 140. The first loop pattern 160 includes a plurality of first wirings 162, and the first loop pattern 160 can form a mesh structure through the first wirings 162. The material of the first wirings 162 may be aluminum, copper or other suitable metallic material. In some embodiments, the first wirings 162 may have the wiring width W1 of between 4 microns and 6 microns. The size level of the wiring width W1 enables the mesh structure formed of the first wirings 162 to have high light transmittance, thereby reducing the effect of the first loop pattern 160 on the display function of the display panel 100A. That is, the image provided by the pixels in the display area 102 can pass through the first loop pattern 160 due to the high light transmittance of the first loop pattern 160.

Moreover, the first loop pattern 160 is formed by extending along a plurality of straight paths, and these straight paths include the paths extending in the lateral direction and the paths extending in the longitudinal direction. In other words, the angle between these straight paths to each other may be 0, 90, 180 or 270 degrees, and the relative positional relationship of these straight paths to each other includes a lateral translation or a longitudinal translation.

The second loop pattern 170 is arranged within the first wiring area 104, and the second loop pattern 170 is located outside the second wiring area 106. In other words, the second loop pattern 170 may be viewed as to be completely located within the first wiring area 104 and not within the display area 102 and the second wiring area 106.

The second loop pattern 170 includes a plurality of second wirings 172. The material of the second wirings 172 may be aluminum, copper or other suitable metallic material. In some embodiments, the first wirings 162 and the second wirings 172 may be formed by patterning the same metal layer. The second loop pattern 170 is electrically connected to the first loop pattern 160. The first loop pattern 160 and the second loop pattern 170 are electrically connected by contacting each other via the wirings. For example, as shown in FIG. 1D, the plural first wirings 162 of the first loop pattern 160 may contact the second wirings 172 of the second loop pattern 170. The wiring width W1 of the first wirings 162 is smaller than the wiring width W2 of the second wirings 172. In some embodiments, the second wirings 172 may have the wiring width W2 of between 0.5 millimeters and 10 millimeters. Since the wiring width W1 of the first wirings 162 is smaller than the wiring width W2 of the second wirings 172, the impedance of the second loop pattern 170 is smaller than the impedance of the first loop pattern 160. Similarly, the second loop pattern 170 may also be formed by extending along a plurality of straight paths.

The first loop pattern 160 may form a multi-turn loop in conjunction with the second loop pattern 170. For example, as shown in FIG. 1A, the first loop pattern 160 in conjunction with the second loop pattern 170 can sequentially form a three-turn loop from the center of the display area 102 to outside, and the present disclosure is not limited thereto. In some other embodiments, the number of the loops formed by the first loop pattern 160 in conjunction with the second loop pattern 170 may be smaller than or more than three turns. In addition, on the condition that the first loop pattern 160 and the second loop pattern 170 are formed by extending along a plurality of straight paths, the multi-turn loop formed by the first loop pattern 160 in conjunction with the second loop pattern 170 may be easily arranged to show the line of symmetry, for example, the line of symmetry is showed with respect to the longitudinal line passing through the center of the display area 102.

The bridging pattern 180 is arranged within the second wiring area 106, such that the second loop pattern 170 and the bridging pattern 180 are opposite to each other. Specifically, the display area 102 may have a first area 103A and a second area 103B which are not overlapped with each other. The first area 103A surrounds the second area 103B, and the first loop pattern 160 is completely located within the first area 103A. The second area 103B is located between the first wiring area 104 where the second loop pattern 170 is located and the second wiring area 106 where the bridging pattern 180 is located. The bridging pattern 180 is electrically connected to the first loop pattern 160, in which the first loop pattern 160 and the bridging pattern 180 are in contact with each other to achieve electrical connection.

The bridging pattern 180 includes a plurality of third wiring 182. The material of the third wirings 182 may be aluminum, copper or other suitable metallic material. In some embodiments, the first wirings 162, the second wirings 172, and the third wirings 182 may be formed by patterning the same metal layer. The wiring width W1 of the first wirings 162 is smaller than the wiring width W3 of the third wirings 182. In some embodiments, the third wirings 182 may have the wiring width W3 of between 0.5 millimeters and 10 millimeters.

The bridging pattern 180 may connect with different terminals of the first loop pattern 160, such that the first loop pattern 160 can form a loop antenna in conjunction with the second loop pattern 170 and the bridging pattern 180. When the current is input to one terminal of this loop antenna (e.g., the terminal T1), the current is output from the other opposite terminal of the loop antenna (e.g., the terminal T2) after flowing through the entire loop antenna.

The display panel 100A can implement the wireless communication function by using the loop antenna. For example, the display panel 100A may further include a driving component 108. The driving component 108 may be arranged in the second wiring area 106, and electrically connected to two blocks of the bridging pattern 180 (e.g., the terminals T1 and T2). That is, the driving component 108 may be electrically connected to the loop antenna through the bridging pattern 180. The driving component 108 may be used to provide an alternating current signal, such as a sine wave signal or an oscillation signal. By using the driving component 108 to provide the alternating current signal to the loop antenna, the loop antenna may generate the magnetic field by coupling to provide the near-field wireless communication function.

As described above, since the first loop pattern 160 has high light transmittance, the loop antenna also has high light transmittance in a portion corresponding to the display area 102. Therefore, the display function of the display panel 100A is not interfered by the configuration of the wireless communication function, that is, the display panel 100A can simultaneously perform the display function and the wireless communication function. On the other hand, on the condition that the wiring width W2 of the second wirings 172 of the second loop pattern 170 and the wiring width W3 of the third wirings 182 of the bridging pattern 180 are larger than the wiring width W1 of the first wirings 162 of the first loop pattern 160, the second loop pattern 170 and the bridging pattern 180 can help reduce the impedance of the loop antenna, and thereby enhancing the magnetic field strength and increasing the transmission energy of the wireless communication. The wiring width W2 of the second wirings 172 of the second loop pattern 170 and the wiring width W3 of the third wirings 182 of the bridging pattern 180 may cause the second loop pattern 170 and the bridging pattern 180 to have lower light transmittance than the first loop pattern 160. However, since the second loop pattern 170 and the bridging pattern 180 are not located in the display area 102, they do not affect the display function of the display panel 100A.

On the other hand, in the present embodiment, the second loop pattern 170 and the bridging pattern 180 are opposite to each other, that is, the arrangement of the second loop pattern 170 and the bridging pattern 180 is that one is above and another is below the first loop pattern 160. Therefore, the lower impedance areas of the loop antennas are distributed on the upper and lower sides. With this arrangement, the magnetic field distribution generated by the loop antenna by coupling can be balanced, and thus improving the strength and accuracy of the wireless communication.

Moreover, the strength of the wireless communication can also be adjusted by adjusting the respective extension lengths of the first loop pattern 160, the second loop pattern 170, and the bridging pattern 180. For example, the loop extension length of the first loop pattern 160 has a first length L1 (including the sum of the lengths of the lateral extension and the longitudinal extension), the loop extension length of the second loop pattern 170 has a second length L2 (including the sum of the lengths of the lateral extension and the longitudinal direction), and the bridging extension length of the bridging pattern 180 has a third length L3 (including the sum of the lengths of the lateral extension and the longitudinal extension). The relationship between the first length L1, the second length L2, and the third length L3 may satisfy the relation formulas (I) and (II). The relation formula (I) is: $0.05*(L1+L2+L3)$ $(L2+L3) \leq 0.4*(L1+L2+L3)$. The relation formula (II) is: $(L1) > (L2+L3)$. By designing the first length L1, the second length L2, and the third length L3 to satisfy the relation formulas (I) and (II), the impedance of the loop antenna is able to conform to the requirement of the wireless communication, and the portion of the loop antenna in the corresponding display area 102 still can maintain high light transmittance.

In some embodiments, the dielectric material 196 can be filled in between the first loop pattern 160, the second loop pattern 170, and the bridging pattern 180 to form a protective layer, thereby preventing the first loop pattern 160, the second loop pattern 170 and the bridging pattern 180 from damage. The present disclosure is not limited thereto, and the dielectric material 196 may be omitted in other embodiments. In some embodiments, the display panel 100A may further include a second adhesive layer 198 and a light shielding layer 199, in which the second adhesive layer 198 may be an optically clear adhesive and the light shielding layer 199 may be an ink. The cover plate 190 may be a light transmissive glass, and can be fixed via the second adhesive layer 198. The light shielding layer 199 may be disposed between the second adhesive layer 198 and the cover plate 190, and located above the second loop pattern 170. For example, the vertical projection of the second loop pattern 170 to the third substrate 194 is completely fall within the vertical projection of the light shielding layer 199 to the third substrate 194, and thus the second loop pattern 170 is shielded by the light shielding layer 199.

Figure 2:
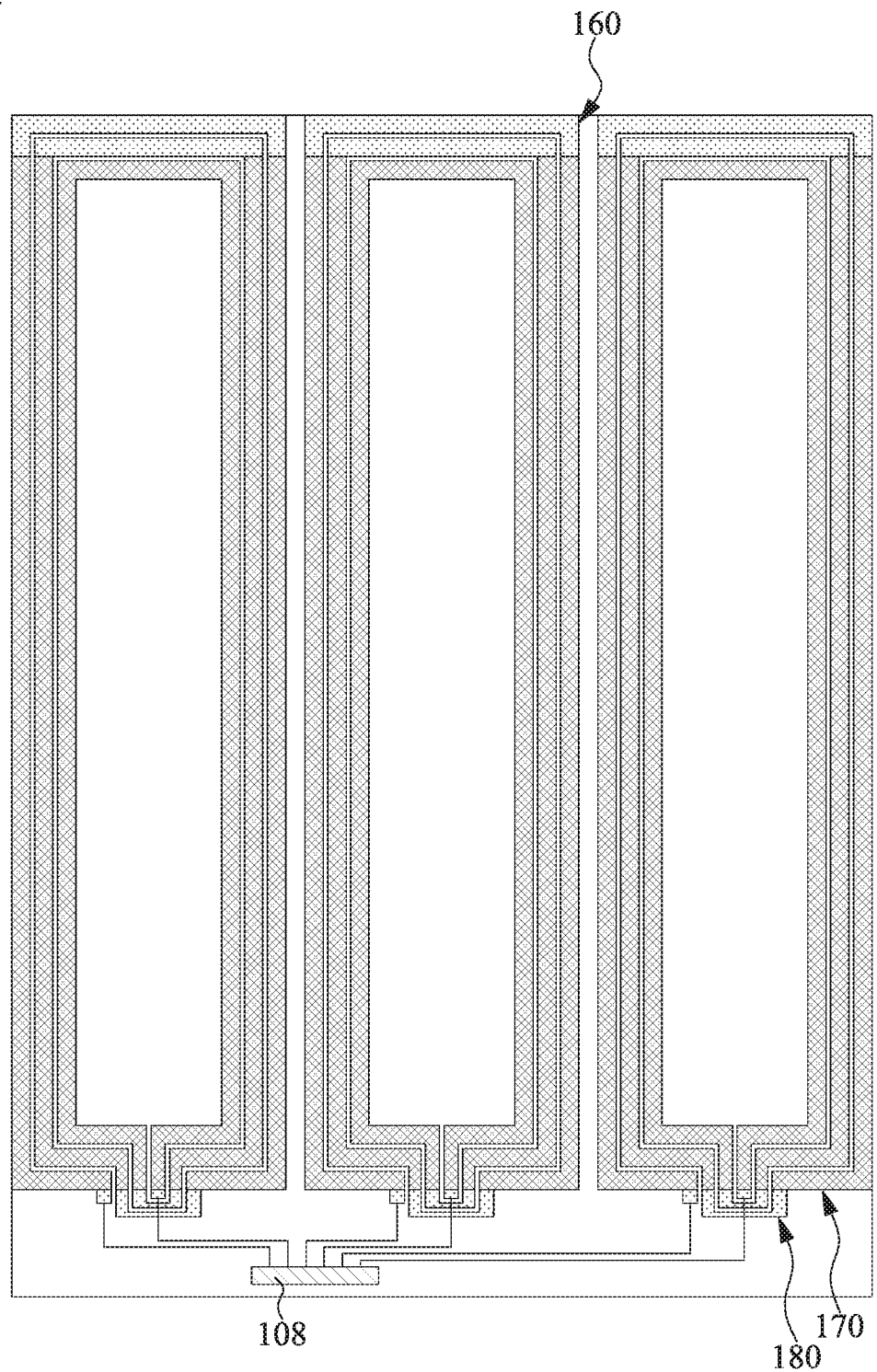
FIG. 2 illustrates a top view of a display panel according to a second embodiment of the present disclosure.

Reference is made to FIG. 2. FIG. 2 illustrates a top view of a display panel 100B according to a second embodiment of the present disclosure. At least one difference between the present embodiment and the first embodiment is that, comparing with the first embodiment, more first loop patterns 160, second loop patterns 170, and bridging patterns 180 are arranged in the present embodiment, thereby forming more loop antennas. For example, the number of the loop antennas in the present embodiment is three. The loop antennas are separated from each another, and each of them can generate the magnetic field by coupling while the driving component 108 inputs the alternating current signal. By increasing the number of the loop antennas, the strength of the magnetic field can be further increased and the transmission energy of wireless communication can be enhanced.

Figure 3:
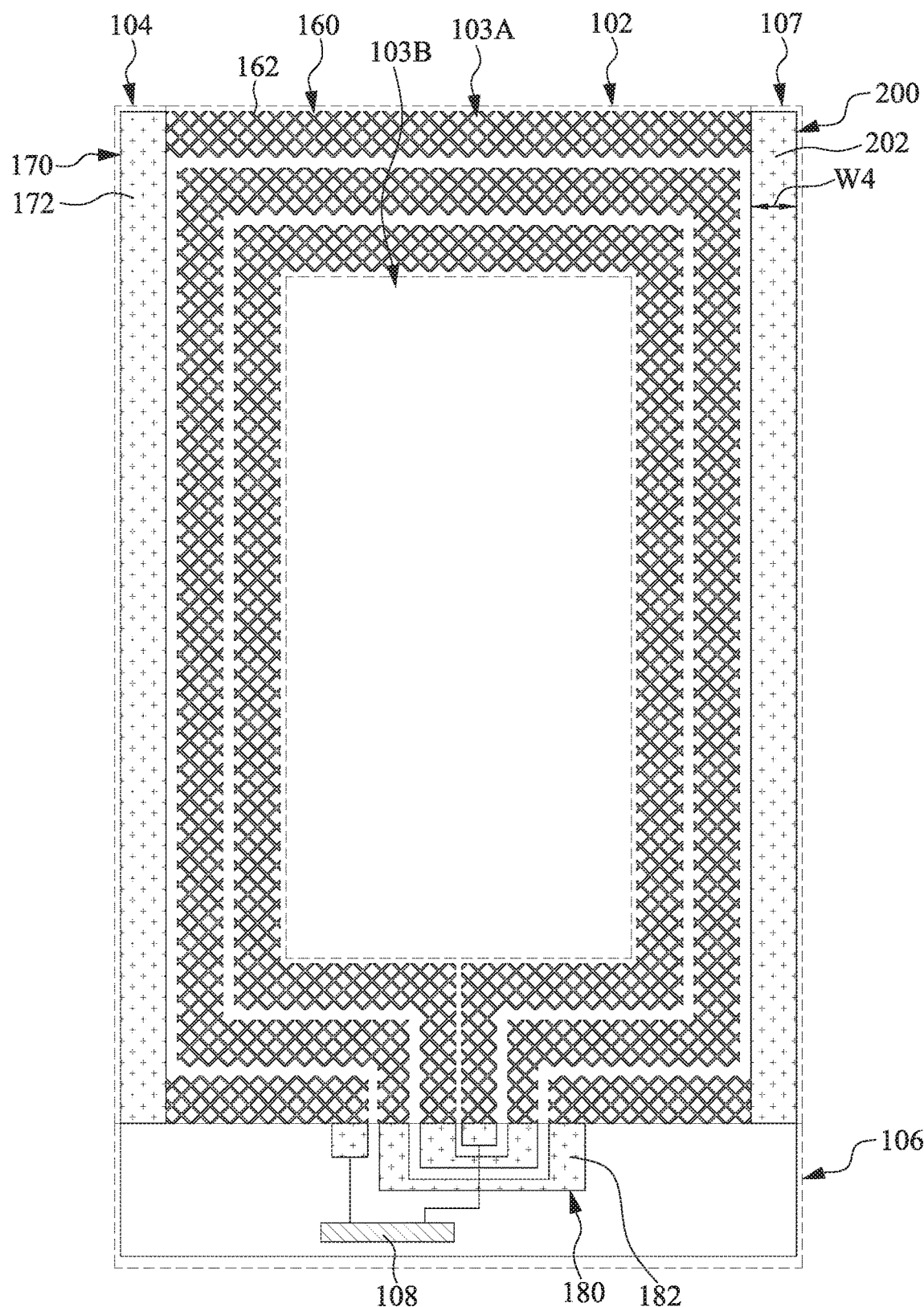
FIG. 3 illustrates a top view of a display panel according to a third embodiment of the present disclosure.

Reference is made to FIG. 3. FIG. 3 illustrates a top view of a display panel 100C according to a third embodiment of the present disclosure. At least one difference between the present embodiment and the first embodiment is that the wiring areas are arranged on the left and right sides of the display area 102 in the present embodiment. In the present embodiment, the display panel 100C has a third wiring area 107, and the display area 102 is adjacent to the third wiring area 107. The first wiring area 104 and the third wiring area 107 are opposite to each other, that is, the first wiring area 104 and the third wiring area 107 are presented that one is left and another is right for the display area 102. Further, the display area 102 has the first area 103A and the second area 103B that are not overlapped with each other, the first area 103A surrounds the second area 103B, and the first loop pattern 160 is completely located within the first area 103A. The second area 103B is located between the first wiring area 104 and the third wiring area 107. In addition, the second wiring area 106 is located on the same side of the display area 102, the first wiring area 104, and the third wiring area 107.

The display panel 100C further includes a third loop pattern 200. The third loop pattern 200 is arranged within the third wiring area 107 and electrically connected to the first loop pattern 160. The third loop pattern 200 includes at least one fourth wiring 202. The material of the fourth wiring 202 may be aluminum, copper or other suitable metallic material. In some embodiments, the first wirings 162, the second wirings 172, the third wirings 182, and the fourth wiring 202 can be formed by patterning the same metal layer. The wiring width of the first wirings 162 (not labeled, which is, for example, the wiring width W1 of FIG. 1D) is smaller than the wiring width W4 of the fourth wiring 202. In some embodiments, the fourth wiring 202 may have the wiring width W4 of between 0.5 millimeters and 10 millimeters. Since the wiring width of the first wirings 162 is smaller than the wiring width W4 of the fourth wiring 202, the impedance of the third loop pattern 200 is smaller than the first loop pattern 160. Similarly, the third loop pattern 200 may also be formed by extending along a plurality of straight paths.

In the present embodiment, the first loop pattern 160, the second loop pattern 170, the third loop pattern 200, and the bridging pattern 180 may collectively form a loop antenna, and the lower impedance areas of the loop antenna may be distributed on the left, right and lower sides of the loop antenna. The loop antenna can generate the magnetic field by coupling while the driving component 108 inputs the alternating signal. With this configuration, increasing magnetic field strength and enhancing the transmission energy of the wireless communication can be achieved due to reducing the loop impedance. In addition, balancing the magnetic field distribution of the loop antenna can be implemented, and thus enhancing the strength of the wireless communication. Similarly, since the third loop pattern 200 is not located in the display area 102, the third loop pattern 200 does not affect the display function of the display panel 100A. In some embodiments, the appearances of the second loop pattern 170 and the third loop pattern 200 show the line of symmetry with respect to the first loop pattern 160, so as to further achieve balancing the magnetic field distribution of the loop antenna.

Figure 4:
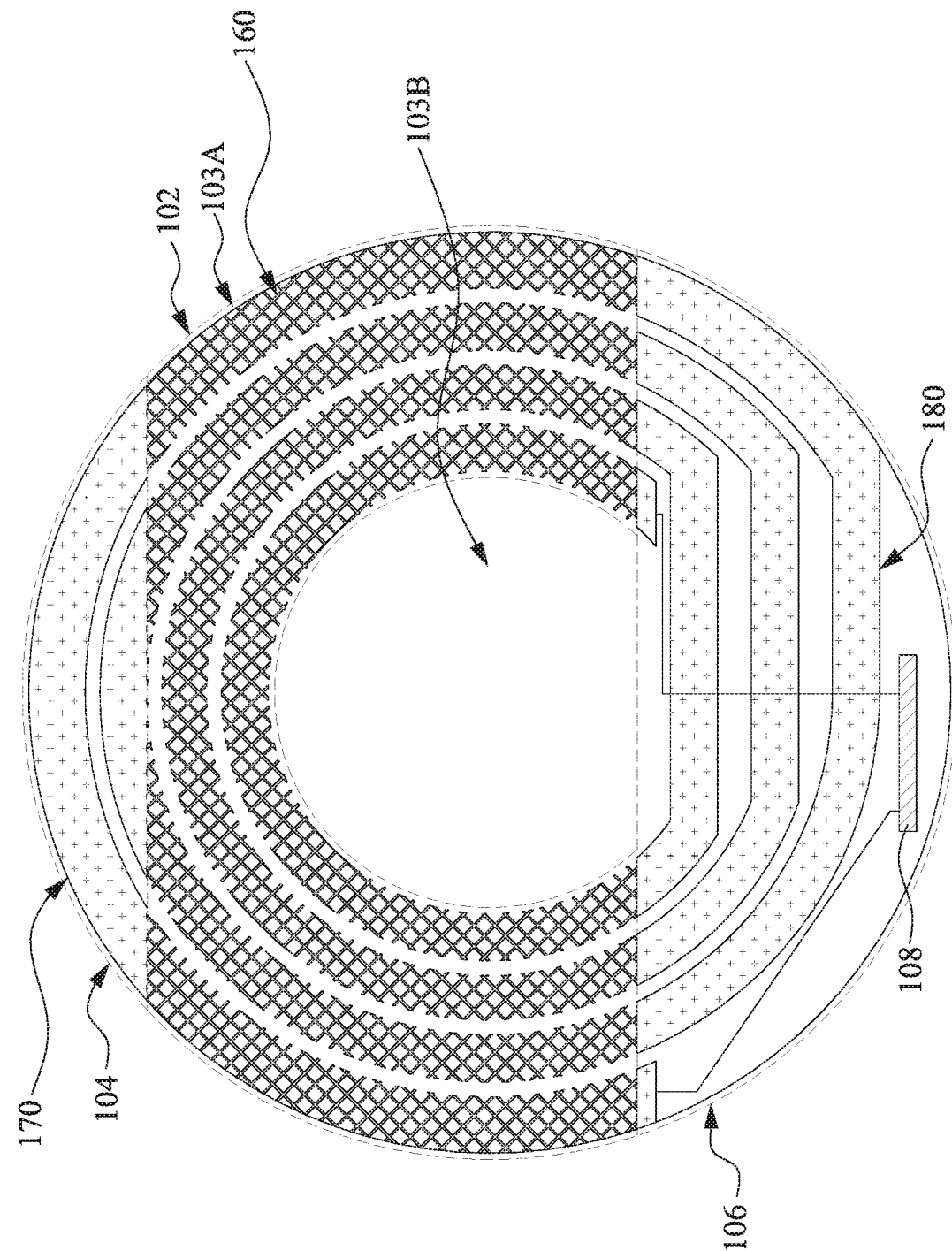
FIG. 4 illustrates a top view of a display panel according to a fourth embodiment of the present disclosure.

Reference is made to FIG. 4. FIG. 4 illustrates a top view of a display panel 100D according to a fourth embodiment of the present disclosure. At least one difference between the present embodiment and the first embodiment is that the display panel 100D has an arcuate profile, and the second wiring area 106, the display area 102, and the first wiring area 104 may be arranged from bottom to top sequentially in the present embodiment.

The first loop pattern 160 is arranged within the display area 102, and the second loop pattern 170 is arranged within the first wiring area 104. The first loop pattern 160 and the second loop pattern 170 are formed by extending along a plurality of circular arc paths. The bridging pattern 180 is arranged within the second wiring area 106, and connects to different terminals of the first loop pattern 160. The arrangement of the second loop pattern 170 and the bridging pattern 180 is that one is above and another is below the first loop pattern 160, so as to achieve balancing the magnetic field distribution of the loop antenna. For example, the display area 102 may have the first area 103A and the second area 103B which are not overlapped with each other. The first area 103A surrounds the second area 103B, and the first loop pattern 160 is completely located within the first area 103A. The second area 103B is completely located between the first wiring area 104 and the second wiring area 106. By this arrangement, the first loop pattern 160, the second loop pattern 170 and the bridging pattern 180 may collectively form the loop antenna that extends along a plurality of circular arc paths, and the loop antenna can generate the magnetic field by coupling while the driving component 108 inputs the alternating current signal.

Figure 5:
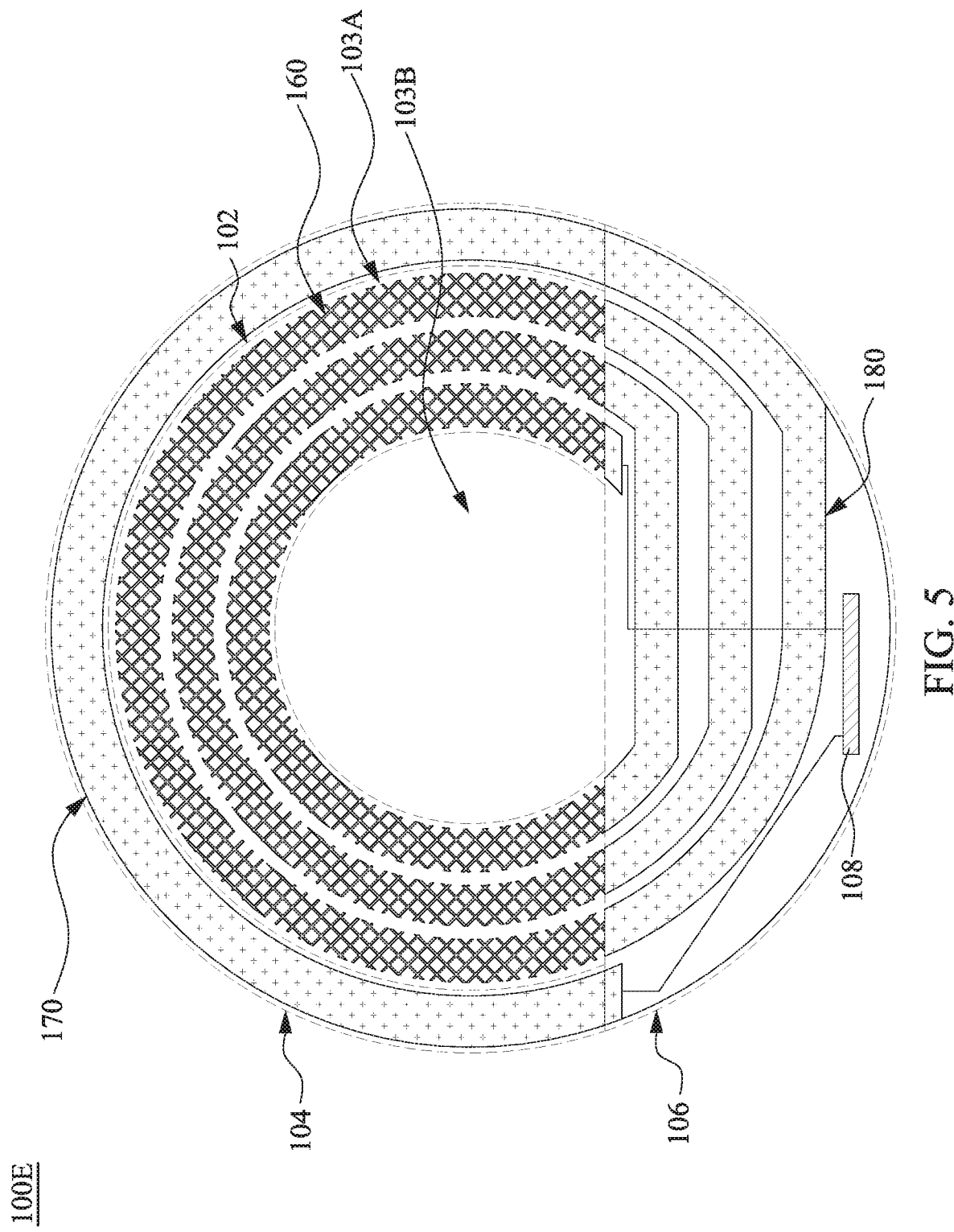
FIG. 5 illustrates a top view of a display panel according to a fifth embodiment of the present disclosure.

Reference is made to FIG. 5. FIG. 5 illustrates a top view of a display panel 100E according to a fifth embodiment of the present disclosure. At least one difference between the present embodiment and the first embodiment is that the display panel 100E of the present embodiment has an arcuate profile, the first wiring area 104 and the second wiring area 106 are located on the outer edge of the display panel 100E, and the display area 102 is located between the first wiring area 104 and the second wiring area 106.

The first loop pattern 160 is disposed within the display area 102, the second loop pattern 170 is disposed within the first wiring area 104, and the first loop pattern 160 and the second loop pattern 170 are formed by extending along a plurality of circular or arc paths. The bridging pattern 180 is arranged within the second wiring area 106 and connects to different terminals of the first loop pattern 160. The second loop pattern 170 and the bridging pattern 180 are arranged to surround the first loop pattern 160 collectively, so as to achieve balancing the magnetic field distribution of the loop antenna. Specifically, the display area 102 may have the first area 103A and the second area 103B which are not overlapped with each other. The first area 103A surrounds the second area 103B, and the first loop pattern 160 is completely located within the first area 103A. The first area 103A and the second area 103B are completely located between the first wiring area 104 and the second wiring area 106. With this configuration, the first loop pattern 160, the second loop pattern 170 and the bridging pattern 180 may collectively form the loop antenna that extends along the circular or arc paths, and the loop antenna can generate the magnetic field by coupling while the driving component 108 inputs the alternating current signal.

Accordingly, the display panel of the present disclosure includes a plurality of pixels, the first loop pattern, the second loop pattern, and the bridging pattern. The pixels and the first loop pattern are arranged within the display area, and the first loop pattern is located above the pixels. The second loop pattern is arranged within the first wiring area adjacent to the display area. The bridging pattern is arranged within the second wiring area adjacent to the display area, and the first wiring area and the second wiring area are separated by the display area. The first loop pattern includes the first wiring and forms a mesh structure through the first wiring. The second loop pattern includes the second wiring, and the wiring width of the first wiring is smaller than the wiring width of the second wiring. The bridging pattern includes the third wiring, and the wiring width of the first wiring is smaller than the wiring width of the third wiring. With this configuration, the first loop pattern, the second loop pattern, and the bridging pattern may collectively form the loop antenna. Since the mesh structure of the first loop pattern can have high light transmittance, the loop antenna also has high light transmittance in the portion corresponding to the display area. Therefore, the effect of the loop antenna on the display function of the display panel can be reduced. By the difference in size of the wirings, the second loop pattern and the bridging pattern can reduce the impedance of the loop antenna, thereby increasing the strength of the magnetic field and enhancing the transmission energy of the wireless communication. In addition, since the number of the lower impedance area of the loop antenna is more than one, it can help balance the magnetic field distribution generated by the loop antenna by coupling.

While various embodiments of the present invention have been described above, it should be understood that they have been presented by way of example only, and not limitation. Numerous changes to the disclosed embodiments may be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A display panel having a display area, a first wiring area, and a second wiring area, wherein the display area is adjacent to the first wiring area and the second wiring area, wherein the display panel comprises:
    a plurality of pixels arranged in the display area;
    at least one first loop pattern arranged in the display area and located above the pixels, wherein the first loop pattern comprises at least one first wiring;
    at least one second loop pattern arranged in the first wiring area and located outside the second wiring area, wherein the second loop pattern is electrically connected to the first loop pattern and comprises at least one second wiring, and a wiring width of the first wiring is smaller than a wiring width of the second wiring; and
    at least one bridging pattern arranged within the second wiring area and electrically connected to the first loop pattern, wherein the bridging pattern comprises at least one third wiring, and the wiring width of the first wiring is smaller than a wiring width of the third wiring.

2. The display panel of claim 1, wherein a loop extension length of the first loop pattern has a first length L1, a loop extension length of the second loop pattern has a second length L2, and a bridging extension length of the bridging pattern has a third length L3, wherein (L1) >(L2+L3), and 0.05*(L1+L2+L3) ≤(L2+L3) ≤0.4*(L1+L2+L3).

3. The display panel of claim 1, wherein the display area has a first area and a second area which are not overlapped with each other, the first area surrounds the second area, and the first loop pattern is completely located within the first area, wherein the second area is located between the first wiring area and the second wiring area.

4. The display panel of claim 1, wherein the display area has a first area and a second area which are not overlapped with each other, the first area surrounds the second area, and the first loop pattern is completely located within the first area, wherein the display panel has a third wiring area, and the second area is located between the first wiring area and the third wiring area, wherein the display panel further comprises a third loop pattern arranged within the third wiring area and electrically connected to the first loop pattern, the third loop pattern comprises at least one fourth wiring, and the wiring width of the first wiring is smaller than a wiring width of the fourth wiring.

5. The display panel of claim 1, wherein the first loop pattern, the second loop pattern and the bridging pattern form a plurality of loop antennas collectively, and the plurality of loop antennas are separated from each other.

6. The display panel of claim 1, further comprising:
    a driving component electrically connected to two terminals of the bridging pattern, and configured to provide an alternating current signal.

7. The display panel of claim 1, wherein the first loop pattern and the second loop pattern collectively form a multi-turn loop, and each of the loops of the multi-turn loop extends along a plurality of straight paths or a plurality of circular or arc paths.

8. The display panel of claim 1, wherein the first wiring has a wiring width of between 4 microns and 6 microns.

9. The display panel of claim 1, wherein the wiring width of the second wiring is between 0.5 millimeters and 10 millimeters.

* * * * *